(12) United States Patent
Shimizu et al.

(10) Patent No.: US 7,065,447 B2
(45) Date of Patent: Jun. 20, 2006

(54) NAVIGATION SYSTEM, AND PROGRAM AND STORAGE MEDIUM FOR USE IN THE SAME

(75) Inventors: Takanori Shimizu, Okazaki (JP); Noboru Ishibashi, Okazaki (JP); Kunihiro Yamada, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 39 days.

(21) Appl. No.: 10/737,900

(22) Filed: Dec. 18, 2003

(65) Prior Publication Data

US 2004/0143387 A1    Jul. 22, 2004

(30) Foreign Application Priority Data

Dec. 18, 2002    (JP) .............................. 2002-365992

(51) Int. Cl.
*G01C 21/34*    (2006.01)
(52) U.S. Cl. .................. 701/210; 701/202; 701/209; 340/995.19; 340/995.21
(58) Field of Classification Search ................ 701/202, 701/209, 210, 211; 340/995.13, 995.19, 340/995.2, 995.21, 995.22, 995.23
See application file for complete search history.

(56) References Cited

U.S. PATENT DOCUMENTS

| | | | | |
|---|---|---|---|---|
| 5,371,678 A | * | 12/1994 | Nomura | 701/210 |
| 5,428,545 A | * | 6/1995 | Maegawa et al. | 701/210 |
| 5,892,463 A | * | 4/1999 | Hikita et al. | 340/995.13 |
| 6,178,378 B1 | * | 1/2001 | Leibold | 701/202 |
| 6,317,686 B1 | * | 11/2001 | Ran | 701/210 |
| 6,401,027 B1 | * | 6/2002 | Xu et al. | 701/117 |
| 6,480,783 B1 | * | 11/2002 | Myr | 701/117 |
| 6,484,092 B1 | * | 11/2002 | Seibel | 701/209 |
| 6,615,130 B1 | * | 9/2003 | Myr | 701/117 |
| 6,862,524 B1 | * | 3/2005 | Nagda et al. | 701/209 |
| 6,868,331 B1 | * | 3/2005 | Hanebrink | 701/117 |
| 2001/0029425 A1 | * | 10/2001 | Myr | 701/200 |
| 2005/0071081 A1 | * | 3/2005 | Hirose et al. | 701/210 |

FOREIGN PATENT DOCUMENTS

JP    A-10-221100    8/1998

* cited by examiner

*Primary Examiner*—Gary Chin
(74) *Attorney, Agent, or Firm*—Oliff & Berridge, PLC (57) ABSTRACT

A navigation system that searches for a route to a destination based on stored map data and provides navigation guidance to the destination along the route includes a controller that acquires road congestion information associated with the route, searches for the route to the destination based on a calculated search cost and changes a search cost based on predicted secondary congestion that is predicted based on acquired road congestion information, wherein a recommendable route that can avoid congestion is searched based on the search cost that has been changed based on the predicted secondary congestion.

18 Claims, 7 Drawing Sheets

ROAD NAVIGATION GUIDE DATA

| NUMBER OF ROADS (n) | |
|---|---|
| 1 | ROAD NUMBER |
|  | LENGTH |
|  | ROAD ATTRIBUTE DATA |
|  | ADDRESS AND SIZE OF SHAPE DATA |
|  | ADDRESS AND SIZE OF NAVIGATION GUIDE DATA |
|  | ⋮ |
| n |  |

Fig. 3(A)

SHAPE DATA

| NUMBER OF NODES (m) | |
|---|---|
| 1 | EAST LONGITUDE |
|  | NORTH LATITUDE |
|  | ⋮ |
| m |  |

Fig. 3 (B)

NAVIGATION GUIDE DATA

| INTERSECTION NAME |
|---|
| CAUTION DATA |
| ROAD NAME DATA |
| ADDRESS AND SIZE OF ROAD NAME VOICE DATA |
| ADDRESS AND SIZE OF DESTINATION DATA |

Fig. 3(C)

DESTINATION DATA

| NUMBER OF DESTINATIONS (k) | |
|---|---|
| 1 | DESTINATION ROAD NUMBER |
|  | DESTINATION NAME |
|  | ADDRESS AND SIZE OF DESTINATION NAME VOICE DATA |
|  | NAVIGATION DESTINATION DATA |
|  | NAVIGATION GUIDANCE DATA |
|  | ⋮ |
| k |  |

Fig. 3(D)

NAVIGATION DIRECTION DATA

-1 : INVALID
0 : UNNECESSARY
1 : GO STRAIGHT
2 : TURN TO THE RIGHT
3 : CURVE TO THE RIGHT
4 : MAKE A RIGHT U-TURN
5 : TURN TO THE LEFT
6 : CURVE TO THE LEFT
7 : MAKE A LEFT U-TURN

o———o  ROAD

———  RECOMMENDED ROUTE

------  HIGH IN SEARCH COST

∿∿∿  CONGESTED

○────○   ROAD

─────   RECOMMENDED ROUTE

-----   HIGH IN SEARCH COST

∿∿∿   CONGESTED

NAVIGATION SYSTEM, AND PROGRAM AND STORAGE MEDIUM FOR USE IN THE SAME

INCORPORATION BY REFERENCE

The disclosure of Japanese Patent Application No. 2002-365992 filed on Dec. 18, 2002 including the specification, drawings and abstract are incorporated herein by reference in its entirety.

BACKGROUND OF THE INVENTION

1. Field of Invention

The invention relates to a navigation system and also to a program and a storage medium thereof.

2. Description of Related Art

A navigation system searches for an optimum route that gives the lowest sum of search costs assigned to respective link roads along a route to a destination, and provides navigation guidance to the destination along the determined optimum route. In some cases, an accidental or unpredictable obstacle, such as road repairs or congestion, occurs during navigation along a route. Japanese Unexamined Patent Application Publication No. 10-221100, which is incorporated herein by reference in its entirety, discloses a navigation system having an additional function that selects an alternative route when an obstacle such as road repair or congestion occurs.

In the method of determining an alternative route in Japanese Unexamined Patent Application Publication No. 10-221100, the user is allowed to select a distance from the current position of the vehicle while increasing the search cost. The increment of the search cost decreases as the distance between the road section of the original route and the obstacle increases. The increase of the search cost relating to the original road section, caused by the described method, enables the system to produce an alternative route from the current position of the vehicle, i.e., the position of the obstacle on the road to a certain point on the original route.

However, with such conventional navigation systems, many vehicles encountered by an obstacle try to avoid the obstacle by using the same alternative route, and thus congestion also occurs on the alternative route. As a result, it becomes necessary to search for another alternative route. Thus, the operation has to be repeatedly performed.

SUMMARY OF THE INVENTION

The invention thus provides a navigation system that is capable of efficiently searching, based on acquired road congestion information, an optimum route which would detour a point or road of congestion, thus avoiding the congestion.

The invention according to a first exemplary aspect of the invention includes a navigation system that searches for a route to a destination based on stored map data and provides navigation guidance to the destination along the route includes a controller that acquires road congestion information associated with the route, searches for the route to the destination based on a calculated search cost and changes a search cost based on predicted secondary congestion that is predicted based on acquired road congestion information, wherein a recommendable route that can avoid congestion is searched based on the search cost that has been changed based on the predicted secondary congestion.

The invention, according to another exemplary aspect, includes a program for a navigation system that searches for a route to a destination based on stored map data and provides navigation guidance to the destination along the route. The program includes a routine that acquires road congestion information associated with the route, a routine that predicts secondary congestion based on the road congestion information, a routine that changes a search cost for searching for the route based on predicted secondary congestion; and a routine that searches for a recommendable route that can avoid congestion based on the changed search cost.

The invention, according to another exemplary aspect, includes a storage medium for a navigation system that searches for a route to a destination based on stored map data and provides navigation guidance to the destination along the route including map data used in searching for a route and navigation guidance along the route and a program. The program including a routine that acquires road congestion information associated with the route, a routine that predicts secondary congestion based on the road congestion information, a routine that changes a search cost for searching for the route based on predicted secondary congestion and a routine that searches for a recommendable route that can avoid congestion based on the changed search cost.

For the purposes of this disclosure, device and means may be considered synonyms. Further, in some cases, as defined in the specification, the device/means may include other elements.

BRIEF DESCRIPTION OF THE DRAWINGS

The above and other objects, features and advantages of the invention will become clear from the following description of the preferred embodiment in conjunction with the accompanying drawings, wherein.

DETAILED DESCRIPTION OF PREFERRED EMBODIMENTS

Figure 1:
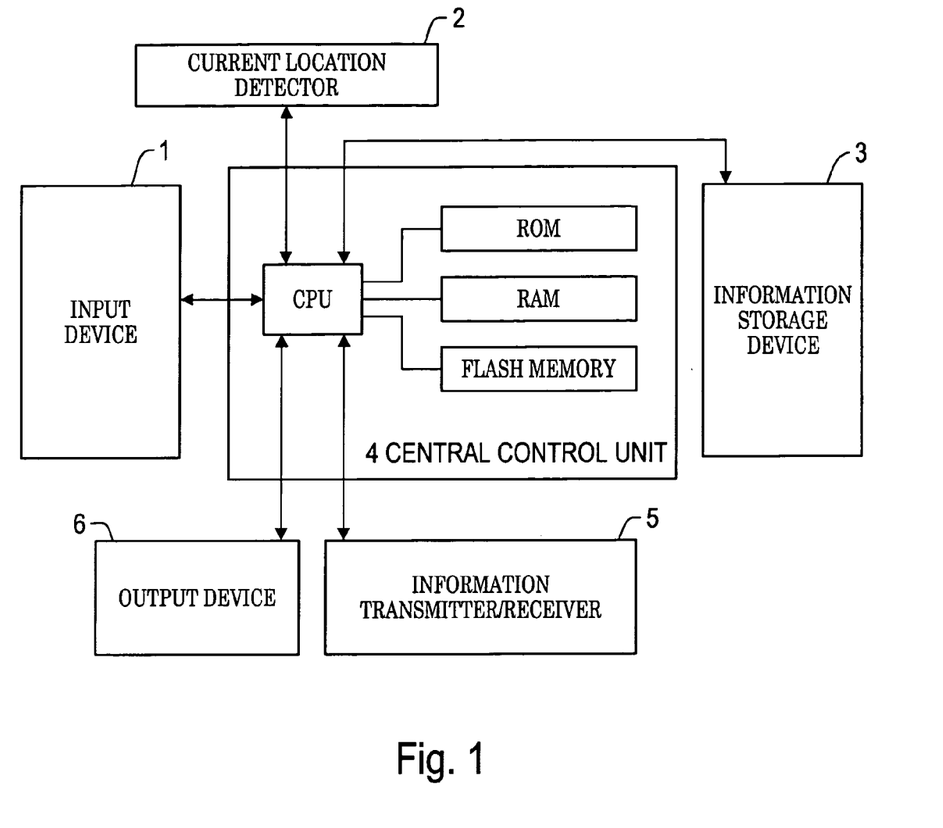
FIG. 1 is a diagram showing a navigation system according to an embodiment of the invention.

Embodiments of the invention are described below with reference to the accompanying drawings. FIG. 1 is a diagram showing a navigation system according to an embodiment of the invention. As shown in FIG. 1, the navigation system includes an input device 1 for inputting information associated with a navigation guide; a current location detector 2 for detecting information associated with the current location of a vehicle; an information storage device 3 for storing navigation data necessary in calculating a route, navigation guidance data necessary in providing navigation guidance, and a navigation program; a central control unit 4 for searching for a route, displaying the determined route, providing a navigation guide along the route, and controlling other operations of the entire system; an information transmitter/receiver unit 5 for communicating with an information center that provides data necessary for navigation in response to a request from a driver or for communicating with an information source such as an electronic notepad in which data such as map data or destination data specific to the driver is stored; and an output device 6 for outputting information associated with the navigation guide. The construction of each part is described below.

The input device 1 is used by a driver to input, into the central control unit 4, data indicating a destination and a command to perform a navigation process in which navigation guidance information is provided by means of a voice/sound or an image displayed on a screen when the driver needs the navigation guidance information. To achieve the above capability, the input device includes a touch switch or an operation switch for inputting a telephone number or coordinates of a destination on a map thereby specifying the destination or for inputting a navigation request command. A remote control unit or the like may also be used as the input device. The input device may additionally include a speech recognition unit for inputting a voice command, and/or a card reader for reading data stored in an IC card or a magnetic card.

The information transmitter/receiver unit 5 includes a receiver serving as traffic information acquisition means for receiving information transmitted from a VICS (Vehicle Information and Communication System) or a data transmitter/receiver unit. The VICS is a system for transmitting road traffic information in real time to vehicles by means of FM multiplex broadcasting (teletext), a radio beacon, or a light beacon. FM multiplex broadcasting is used to transmit general information over a wide area. On the other hand, the radio beacon or the light beacon is used to transmit detailed information associated with a small area with a radius less than about 10 km from the beacon center, wherein vehicles can receive the information when the vehicles pass the beacon. Data transmitted by the VICS includes data indicating, for each road assigned a particular link number, the degree of congestion (for example, impassable, jammed, very crowded, crowded, or not crowded), a congestion start point, a congestion length, a traffic restriction (for example, closed or in construction), and a travel time (needed to pass a congested zone at a particular speed). As for the data transmitter/receiver unit, for example, a portable telephone or a personal computer may be used to transmit and receive information necessary in navigation to or from a traffic information center (such as an ATIS) in response to a request issued by a driver.

The output device 6 is capable of outputting guidance information in the form of a voice/sound or a screen image when a driver needs such guidance information, and is also capable of printing data processed by the central control unit 4. To realize the above capabilities, the output device 6 includes a display for displaying input data on the screen thereof or automatically displaying navigation guidance information on the screen in response to a request from the driver, and also includes a printer for printing data processed by the central control unit 4 or data stored in the information storage device 3, and a speaker for outputting navigation guide information in the form of a voice.

As for the display, a color CRT or a color liquid crystal display may be used. The display is used to display various kinds of screens needed in navigation, such as a route setting screen based on map data or navigation guidance data processed by the central control unit 4, a road section diagram screen, or an intersection diagram screen. Buttons used to make settings associated with the navigation guidance or buttons to switch the navigation guidance or the screen are displayed on a corresponding screen. In particular, intersection information such as a name of an intersection that is to be passed is displayed in a color pop-up window on the road section diagram screen, when the intersection information is necessary. The display is disposed, for example, on an instrument panel at a location close to a driver seat so that the driver can get information indicating the current location of the vehicle and information associated with a route from the road section diagram displayed on the display.

The current location detector 2 is a device for detecting information associated with the current location of the vehicle. For example, the current location detector 2 is formed of an absolute direction sensor such as a terrestrial sensor, a steering sensor, a relative direction sensor using a gyroscope or the like, a distance sensor for detecting a travel distance based on the number of wheel revolutions, or a GPS receiver for receiving GPS (Global Positioning System) information.

The information storage device 3 is an external storage device for storing a navigation program and associated data. A specific example of the information storage device 3 is a storage medium such as a CD-ROM. The program stored in the information storage device 3 include an OS part and an application program part for outputting a navigation signal, wherein the application program part includes a map drawing module, a route searching module, a route guiding module, a current location calculation module, a destination setting module, and an operation control module. That is, in the information storage device 3, a program for searching for a route, a program for controlling the display of navigation guidance information, a program for controlling the output of voice information, data used in those programs, display information data used in displaying a map or navigation guidance information are stored. The associated data includes, in the form of data files, map data necessary in the navigation guidance (for example, road map data, house map data, or building structure map data), intersection data, node data, road data, photograph data, registered point data, target point data, navigation guidance data, shape data, guide data, destination data, navigation direction data, detailed destination data, destination pronunciation data, telephone number data, address data, landmark data, and any other data used by the navigation system, wherein those data are stored in the form of files.

The central control unit 4 includes a CPU for performing various kinds of processing, a rewritable ROM (rewritable nonvolatile storage means) such as a flash memory (for example, an EEPROM (Electrically Erasable and Programmable ROM)) for storing important information (such as a route search program, a navigation guidance program, condition setting data, and data indicating various parameters) in a nonvolatile fashion, a ROM serving as nonvolatile storage means in which a program (program loading means) for checking and updating the programs stored in the flash memory is stored, a RAM (such as an SRAM (Static RAM) capable of electrically storing information) serving as a volatile read/write storage means for temporarily storing information specific to the driver, such as point information associated with registered points specified by the driver, frequency information updated by learning, and error correction information associated with various kinds of detection means. The central control unit 4 also includes an image memory for storing image data to be displayed on the display and an image processor for reading image data from the image memory in accordance with a display output control signal supplied from the CPU, for performing image processing on the image data, and for outputting the resultant image data to the display. Furthermore, the central control unit 4 also includes an audio processor for producing synthesized voice/sound data from voice data, phrase data, sentence data, and/or sound data read from the information storage device 3, converting the synthesized voice/sound data into an analog signal, and supplying the resultant analog signal to a speaker, in accordance with a voice/sound output control signal supplied from the CPU.

The programs and data used in the navigation may be read from the outside via the information transmitter/receiver unit 5. When the programs and data used in the navigation are read from the outside via the information transmitter/receiver unit 5, a storage medium such as a DVD may be used instead of the CD-ROM as the information storage device 3 so that the programs and the data stored thereon can be updated to the latest versions. The information storage device 3 may be omitted, and the programs and the data may be directly stored in the flash memory or the RAM in the central control unit 4.

Figure 2:
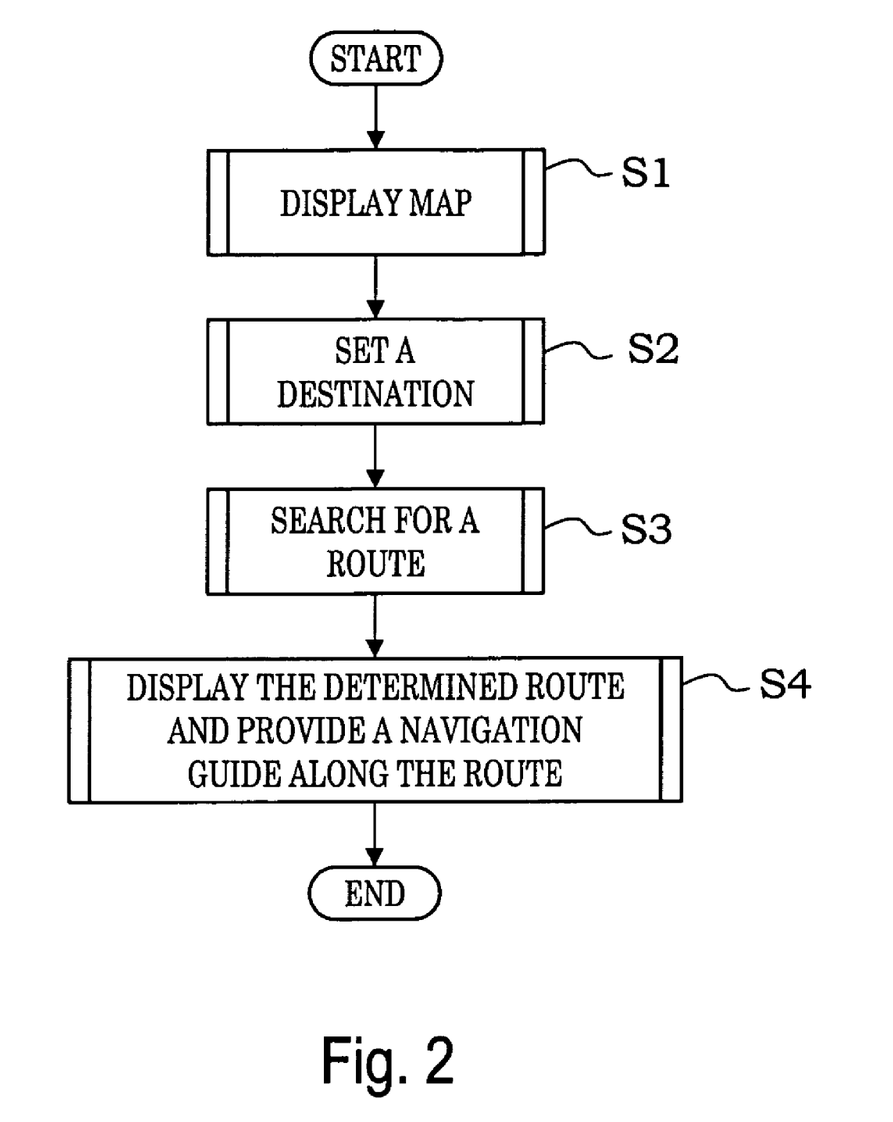
FIG. 2 is a diagram showing the general flow of processing performed by the navigation system according to the embodiment of the invention.

The operation of the navigation system is described below. FIG. 2 is a diagram showing a general flow of the processing performed by the navigation system according to the present embodiment of the invention. In the navigation system constructed in the above-described manner, if the navigation guide system program is started by the CPU of the central control unit 4, the current location is detected by the current location detector 2 and a map around the current location is displayed (step S1) as shown in FIG. 2. Thereafter, a destination is set based on a telephone number, an address, a facility name, or a registered point (step S2). A route from the current location to the destination is then searched for (step S3). When the route is found, the route is displayed and navigation guidance is provided repeatedly while detecting the current location using the current location detector 2, until the destination is reached (step S4).

FIG. 3 is a diagram showing an example of the data structure of road navigation guidance data. As shown in FIG. 3A, a road navigation guidance data file includes data indicating the number, n, of roads included in the route found via the searching process described above, and data indicating, for each of those roads, a road number, a length, a road attribute, the address and the size of shape data, and the address and the size of navigation guidance data, which are stored as data necessary in providing navigation guidance along the route found via the searching process.

Figure 3A:
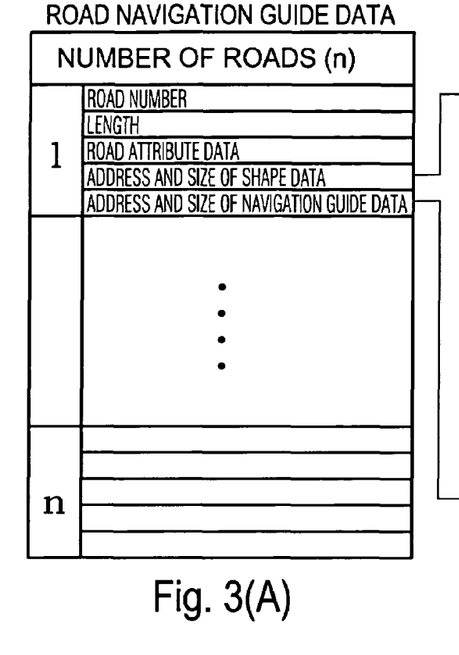
FIG. 3 is a diagram showing an example of the data structure of road navigation guidance data.
Figure 3B:
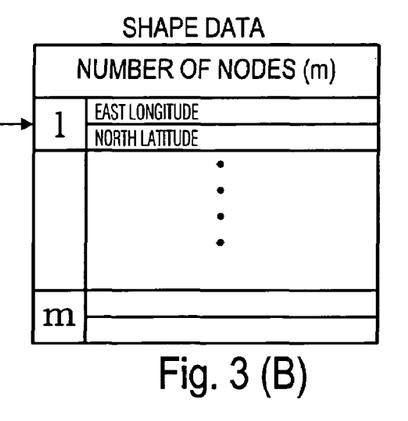
Figure 3C:
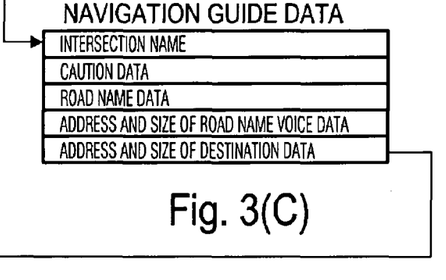

As shown in FIG. 3B, the shape data includes data indicating the number, m, of nodes at which each road is segmented, and also includes coordinate data indicating the coordinates of respective nodes as longitude and latitude. As shown in FIG. 3C, the navigation guidance data includes data indicating an intersection (or branch point) name, caution data, road name data, the address and the size of road name voice data, and the address and the size of destination data.

Figure 3D:
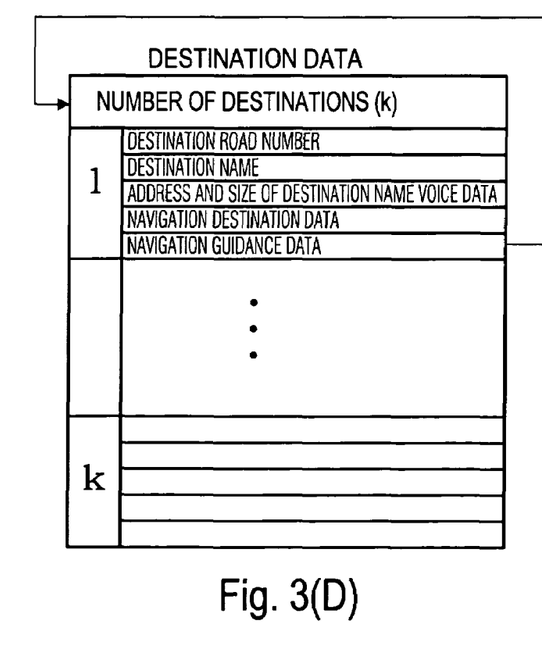
Figure 3E:
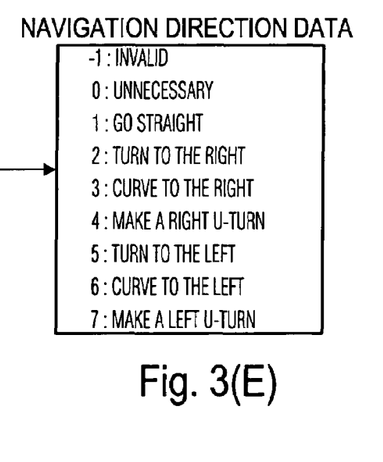

As shown in FIG. 3D, the destination data includes data indicating a destination road number, destination name data, the address and the size of destination name voice data, navigation destination data, and navigation guidance data. The navigation direction data included in the destination data indicates a navigation direction as shown in FIG. 3E. The navigation direction data may be invalid (navigation direction data is not used) or unnecessary (navigation guide is not provided). The navigation direction data may also indicate whether to go straight, turn to the right, curve to the right, make a right U-turn, turn to the left, curve to the left, or make a left U-turn.

Figure 4:
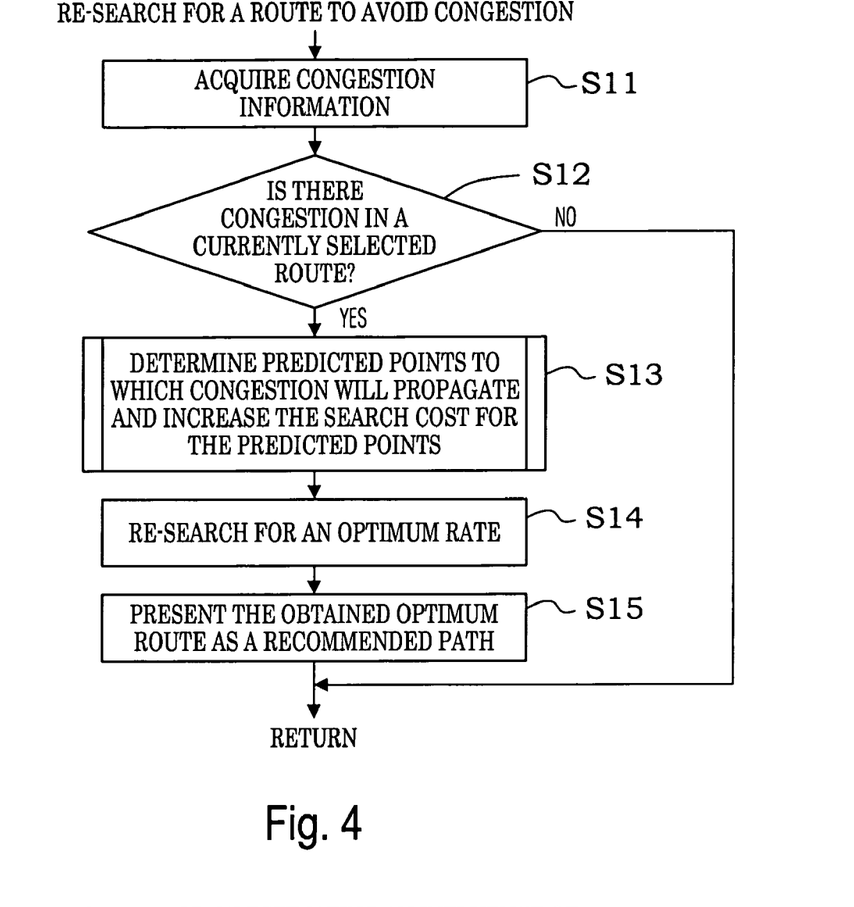
FIG. 4 is a diagram showing an example of a process performed by the navigation system to re-search for a route to avoid congestion, according to the embodiment of the invention.

In the navigation system according to the present embodiment, when a route is being searched for in step S3 or navigation guidance is being provided in step S4, if acquired road congestion information indicates that the currently selected route includes a congested link road, a secondary congestion that may occur due to the current congestion can be predicted. That is, points (roads) where congestion is likely to occur are determined. Thus, a recommended route which can avoid not only the currently congested point (road) but also predicted points (roads) of congestion is searched for, thereby making it possible to efficiently avoid the congestion. FIG. 4 is a diagram showing an example of the process performed by the navigation system to re-search for a route to avoid the congestion, according to the present embodiment of the invention, FIG. 5 is a diagram showing an example of the process of estimation of a predicted point of congestion and FIG. 6 is a diagram showing another example of a process of estimation of a predicted point of congestion.

In the route re-searching process performed by the navigation system according to the present embodiment, as shown in FIG. 4, if road congestion information is acquired (step S11), it is determined whether the road congestion information indicating that the currently selected route along which to provide navigation includes congestion (step S12). If congestion is detected, points (roads) where secondary congestion is likely to occur due to propagation of the current congestion are determined, and the search costs for those points (roads) are increased (step S13). Using the new search costs, a route to the destination is re-searched for (step S14), and the resultant route is presented as a recommended route (step S15).

When searching a route, the road data contained in the route search data is referred to in order to calculate the search cost for each road considered for the route. Here, the search cost means a weight given to each road to be subjected to the route search operation. For example, a weight may be given to a road in view of the following factors: a road type, a toll road or an expressway, length of the road, travel time, width of the road, and right turn or left turn. Accordingly, for example, if the search cost is calculated based on the length of the road, a route that minimizes the total length of the roads to the destination is determined as a distance-optimal route. Further, for example, if the search cost is calculated based on the travel time to the destination, a route that minimizes the total travel time to the destination is determined as a time-optimal route.

Figure 5:
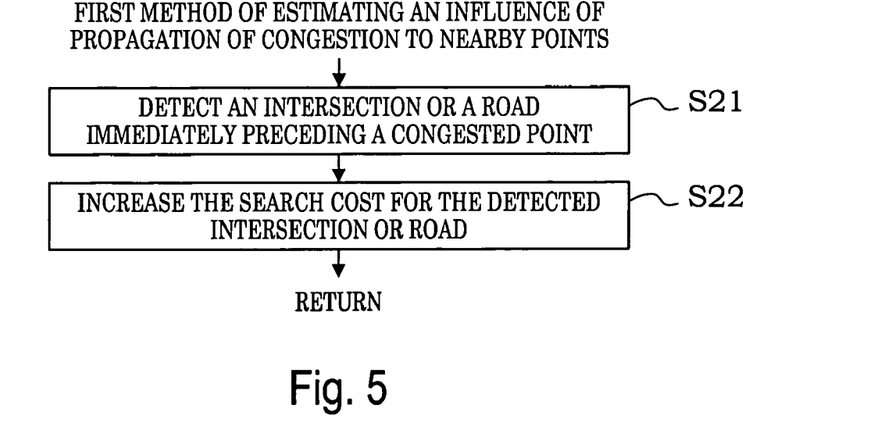
FIG. 5 is a diagram showing an example of a process of estimation associated with the prediction of congestion.
Figure 6:
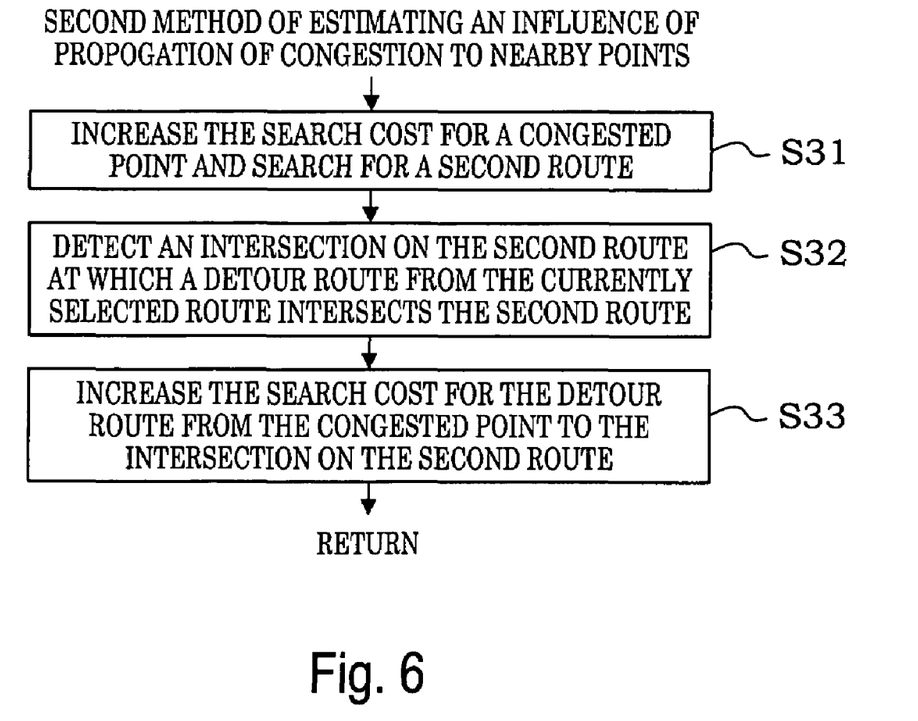
FIG. 6 is a diagram showing another example of a process of estimation associated with the prediction of congestion.

The process of predicting secondary congestion and increasing the search cost for the predicted points in step S13 can be performed, for example, as shown in FIG. 5. As shown in FIG. 5, an intersection or a road preceding the congested point (step S21) is detected, the search cost for the detected intersection or road (step S22) is decreased. When a certain point (road) is congested, it is highly likely that an intersection or a road preceding the congested point will be used as a detour route (alternative route) to avoid the current congestion and thus the intersection will become congested sooner or later. Thus, to avoid such secondary congestion, re-searching for the route is performed such that the intersection or the road preceding the currently congested point is regarded as also being congested. As such, the intersection or the road preceding the currently congested point is not included in the recommended route.

Alternatively, as shown in FIG. 6, the process of predicting secondary congestion and increasing the search cost for the predicted points in step S13 may also be performed by increasing the search cost for the currently congested point (road) and searching for a second route (step S31), detecting an intersection on the second route at which a detour from the currently selected route intersects the second route (step S32), and increasing the search cost for the detour from the congested point to the detected intersection on the second route (step S33). When a certain point (road) is congested, it is highly likely that a second route regarded as being second best to the currently selected route is selected as a new best route to avoid the congestion, and thus congestion will occur also in the second route sooner or later. Thus, to avoid such secondary congestion, a third route is recommended instead of the second route that is likely to be congested as a result of being used as an alternative route.

Figure 7A:
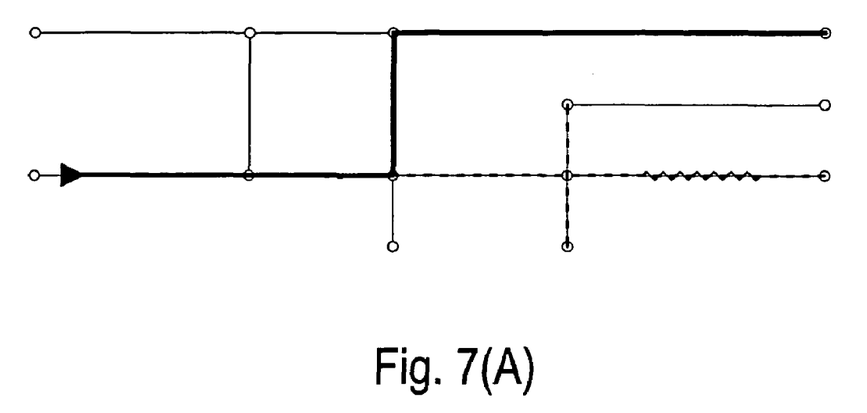
FIGS. 7A and 7B are diagrams showing, in a comparative manner, an example of a route determined in accordance with an embodiment of the invention and an example of a route determined in a conventional technique.
Figure 7B:
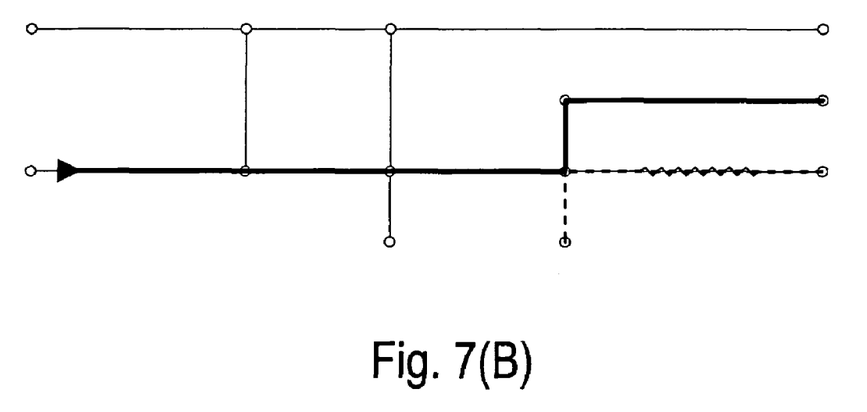

FIG. 7 shows, in a comparative manner, an example of a route determined in accordance with the present embodiment and an example of a route determined in the conventional technique. FIG. 8 shows another example of a route determined in accordance with the present embodiment. If the search cost for a congested link road is simply increased based on road congestion information, as is the case with the conventional navigation system, it is highly likely that a recommended route is selected such that a detour is taken at an intersection preceding the congested point as shown in FIG. 7B. Secondary congestion thus occurs in the recommended route because many vehicles employ the recommended route. In contrast, in the present embodiment, the search cost in the re-searching for a route is increased not only for the currently congested link road but also for the intersection preceding the currently congested link road, and thus a recommended route is selected such that the route does not include roads where secondary congestion is likely to occur, as shown in FIG. 7A.

Figure 8A:
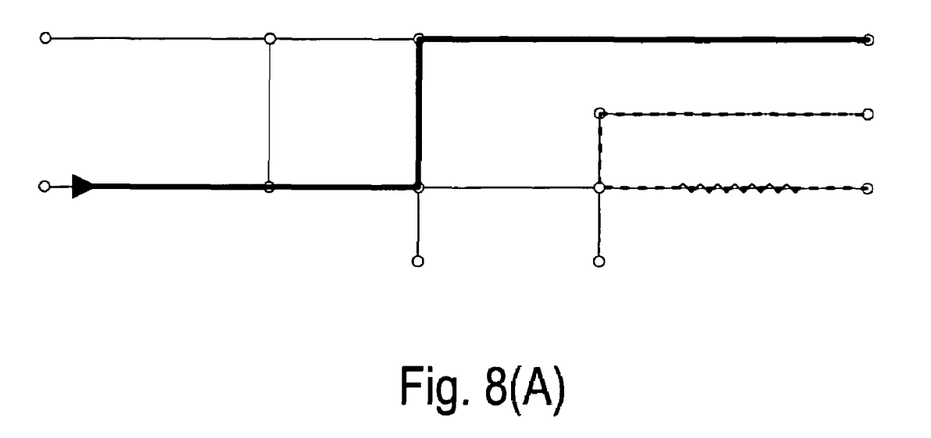
FIGS. 8A and 8B are diagrams showing other examples of routes determined in accordance with the embodiment of the invention.
Figure 8B:
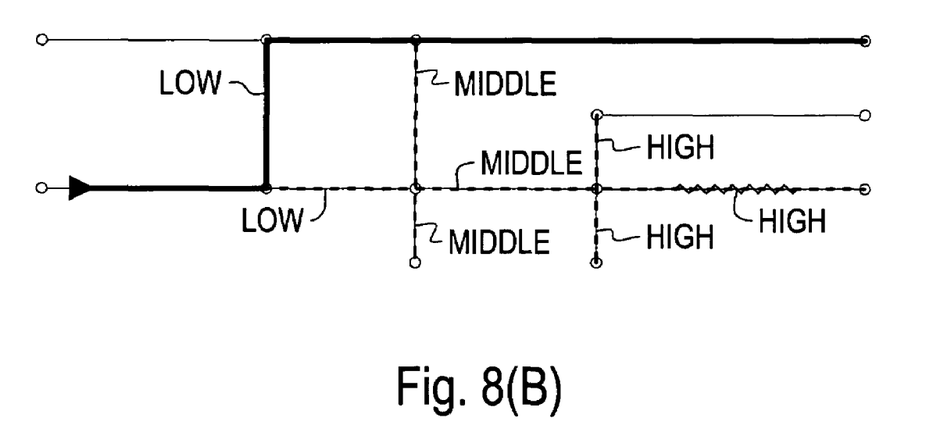

Similarly, as shown in FIG. 8A, a recommended route that avoids roads where secondary congestion is predicted to occur with a high probability can also be determined by increasing the search cost for a route that will be selected if searching is performed by a usual method. Furthermore, as shown in FIG. 8B, a recommended route which avoids roads where secondary congestion is predicted to occur with a high probability can also be determined by setting a large cost for an intersection close to the congestion point and progressively decreasing the increment of the search costs with increasing distance from the intersection close to the congestion.

In the present invention, as described above, when acquired road congestion information indicates that a currently selected route includes congestion, secondary congestion that will occur sooner or later due to the current congestion is predicted. Then, route-searching is performed based on search costs increased for roads predicted to encounter congestion, thereby selecting a route that can avoid not only the current congestion indicated by the road congestion information but also predicted congestion, and thus making it possible to efficiently select an optimum route based on acquired road congestion information without encountering secondary congestion.

It is to be noted that the present invention is not limited to specific embodiments described above, but various modifications are possible. For example, although in the embodiments described above, in estimation of probable congestion, an intersection (road) immediately preceding a currently congested intersection (road) or an intersection on a second route at which a detour is taken from the currently selected route is detected, a predetermined number of intersections on the currently selected route preceding the congested point may be detected and the search cost for those intersections and for link roads between the congested point to those intersections may be increased.

What is claimed is:

1. A navigation system that searches for a route to a destination based on stored map data and provides navigation guidance to the destination along the route, comprising:
   a controller that:
      acquires road congestion information associated with the route from outside a vehicle;
      searches for the route to the destination based on a calculated search cost;
      predicts secondary congestion that occurs due to current congestion based on acquired road congestion information; and
      changes a search cost based on the predicted secondary congestion, wherein a recommendable route that can avoid congestion is searched based on the search cost that has been changed based on the predicted secondary congestion.

2. The navigation system according to claim 1, wherein the controller predicts the congestion at an intersection preceding a congested point indicated by the acquired road congestion information.

3. The navigation system according to claim 2, wherein the controller changes the search cost for a detour route from the intersection.

4. The navigation system according to claim 2, wherein the controller gradually changes stepwise the search cost for each possible detour route taken at each of a plurality of intersections preceding the congested point, depending on the distance between the congested point and the respective intersections.

5. The navigation system according to claim 4, wherein the controller increases the search cost for intersections near the congested point such that an increment of the search cost amounts for the intersections decreases stepwise with increasing distance from the congested point.

6. The navigation system according to claim 1, wherein the controller searches for a second route including a detour route for avoiding a congested point indicated by the road congestion information and changes the search cost for the second route.

7. A storage medium storing a set of program instructions executable on a data processing device and usable to search for a route to a destination based on stored map data and provide navigation guidance to the destination along the route, the instructions comprising:
   acquiring road congestion information associated with the route from outside a vehicle;
   searches for the route to the destination based on a calculated search cost;
   predicting secondary congestion that occurs due to current congestion based on the acquired road congestion information;
   changing a search cost based on the predicted secondary congestion; and searching for a recommendable route that can avoid congestion based on the changed search cost.

8. The storage medium of claim 7, wherein the congestion is predicted at an intersection preceding a congested point indicated by the acquired road congestion information.

9. The storage medium of claim 8, wherein the search cost is changed for a detour route from the intersection.

10. The storage medium of claim 8, wherein the search cost is gradually changed stepwise for each possible detour route taken at each of a plurality of intersections preceding the congested point, depending on the distance between the congested point and the respective intersections.

11. The storage medium of claim 10, wherein the search cost is increased for intersections near the congested point such that an increment of the search cost amounts for the intersections decreases stepwise with increasing distance from the congested point.

12. The storage medium of claim 7, wherein a second route is searched including a detour route for avoiding a congested point indicated by the road congestion information and changes the search cost for the second route.

13. A storage medium storing a set of program instructions executable on a data processing device and usable to search for a route to a destination based on stored map data and provide navigation guidance to the destination along the route, the storage medium comprising:
   map data used in searching for a route and navigation guidance along the route; and
   the instructions comprising:
      acquiring road congestion information associated with the route from outside a vehicle;
      searching for the route to the destination based on a calculated search cost;
      predicting secondary congestion that occurs due to current congestion based on the acquired road congestion information;
      changing a search cost based on the predicted secondary congestion; and
      searching for a recommendable route that can avoid congestion based on the changed search cost.

14. The storage medium of claim 13, wherein the congestion is predicted at an intersection preceding a congested point indicated by the acquired road congestion information.

15. The storage medium of claim 14, wherein the search cost is changed for a detour route from the intersection.

16. The storage medium of claim 14, wherein the search cost is gradually changed stepwise for each possible detour route taken at each of a plurality of intersections preceding the congested point, depending on the distance between the congested point and the respective intersections.

17. The storage medium of claim 16, wherein the search cost is increased for intersections near the congested point such that an increment of the search cost amounts for the intersections decreases stepwise with increasing distance from the congested point.

18. The storage medium of claim 13, wherein a second route is searched including a detour route for avoiding a congested point indicated by the road congestion information and changes the search cost for the second route.

* * * * *